United States Patent [19]

Kenigsberg et al.

[11] 4,003,534
[45] Jan. 18, 1977

[54] PILOT SEAT WITH LATERAL VIBRATION ISOLATION

[75] Inventors: Irwin J. Kenigsberg, Trumbull; William A. Girvan, Stratford; Jerome T. L. Abbe, Derby, all of Conn.

[73] Assignee: United Technologies Corporation, Hartford, Conn.

[22] Filed: Nov. 5, 1975

[21] Appl. No.: 628,872

[52] U.S. Cl. .................... 244/122 R; 248/358 A; 297/216
[51] Int. Cl.² ........................................ B64D 25/04
[58] Field of Search ............... 244/122 R; 297/216, 297/311, 314; 248/358 R, 358 A, 15, 20; 188/1 B; 35/12 H, 12 K

[56] References Cited

UNITED STATES PATENTS 2,301,903  11/1942  Flader ................. 244/122 R X

Primary Examiner—Trygve M. Blix
Assistant Examiner—Barry L. Kelmachter
Attorney, Agent, or Firm—Vernon F. Hauschild

[57] ABSTRACT

An adjustable crashworthy pilot seat adapted to be used in aircraft such as helicopters is supported from the floor thereof within a support frame such that the normal lateral vibrations of the aircraft are not imparted to the pilot and so that the seat retains its crashworthy and adjustment capabilities.

13 Claims, 8 Drawing Figures

RESPONSE

LATERAL VIBRATION INPUT

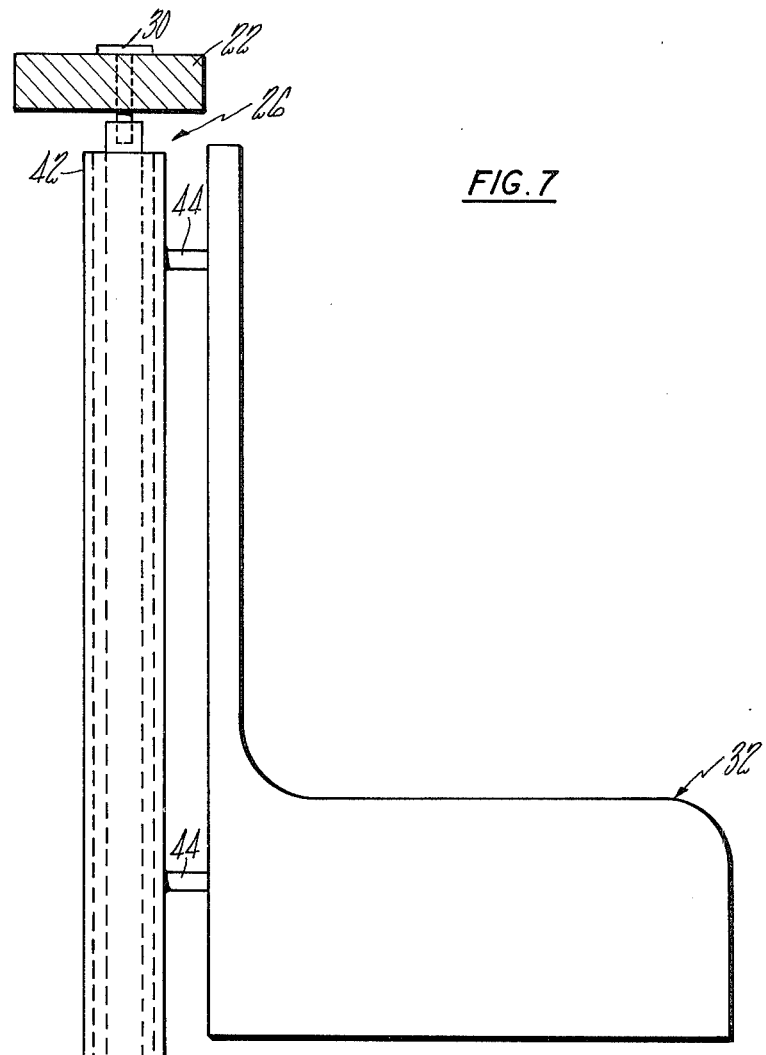
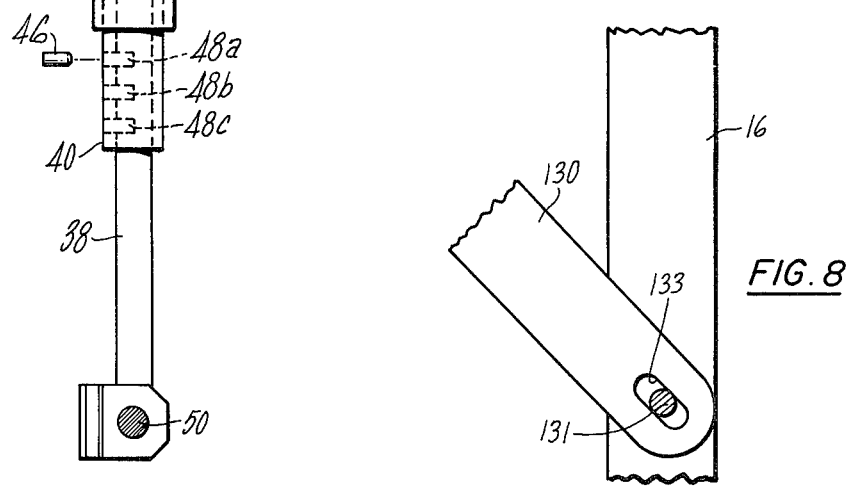

PILOT SEAT WITH LATERAL VIBRATION ISOLATION

BACKGROUND OF THE INVENTION

1. Field of Invention

This invention relates to pilot seats of the type used in aircraft, such as helicopters, which are required to be crashworthy and position adjustable and which, for pilot comfort, are subjected to vehicle vibration minimally.

2. Description of the Prior Art

The prior art has addressed itself to the problem of mounting aircraft seats so as to avoid adverse effects from aircraft vibration, however, none of the prior art patents were faced with the specific problems encountered herein with respect to lateral vibrations and therefore none utilizes the construction taught herein to counteract this problem. Examples of the prior art in this general field are Turner U.S. Pat. No. 1,880,181, Tingler et al U.S. Pat. No. 3,100,618, Kerlui U.S. Pat. No. 3,039,725, Philipp U.S. Pat. No. 3,432,127 and Castillo et al U.S. Pat. No. 3,420,475.

SUMMARY OF THE INVENTION

A primary object of the present invention is to provide a pilot seat for an aircraft so supported as to prevent the seat from amplifying lateral vibration of the aircraft.

In accordance with the present invention, the pilot seat is suspended from a frame member having support mechanism operable so that the frame and seat assembly is of low natural frequency during periods when the vehicle is experiencing normal lateral vibrations and so that the structural stiffness of the frame increases in response to excessive lateral deflections.

In accordance with a further aspect of the present invention, the pilot seat pan is connected to the seat frame so that seat longitudinal restraint loads are imparted to the frame, so that preselected relative lateral motion is permitted between the frame and the seat, and so that the seat and the frame are joined structurally when the preselected lateral relative motion therebetween is dissipated.

In accordance with still a further feature of the present invention, low friction is provided between the seat and the frame in response to the permitted relative lateral motion therebetween.

Other objects and advantages of the present invention may be seen by referring to the following description and claims, read in conjunction with the accompanying drawings.

BRIEF DESCRIPTION OF THE DRAWINGS

FIG. 7 is a showing of an energy absorbing column supporting the seat pan.

FIG. 8 is showing a slop connection used on the pilot seat.

DESCRIPTION OF THE PREFERRED EMBODIMENT

Figure 1:
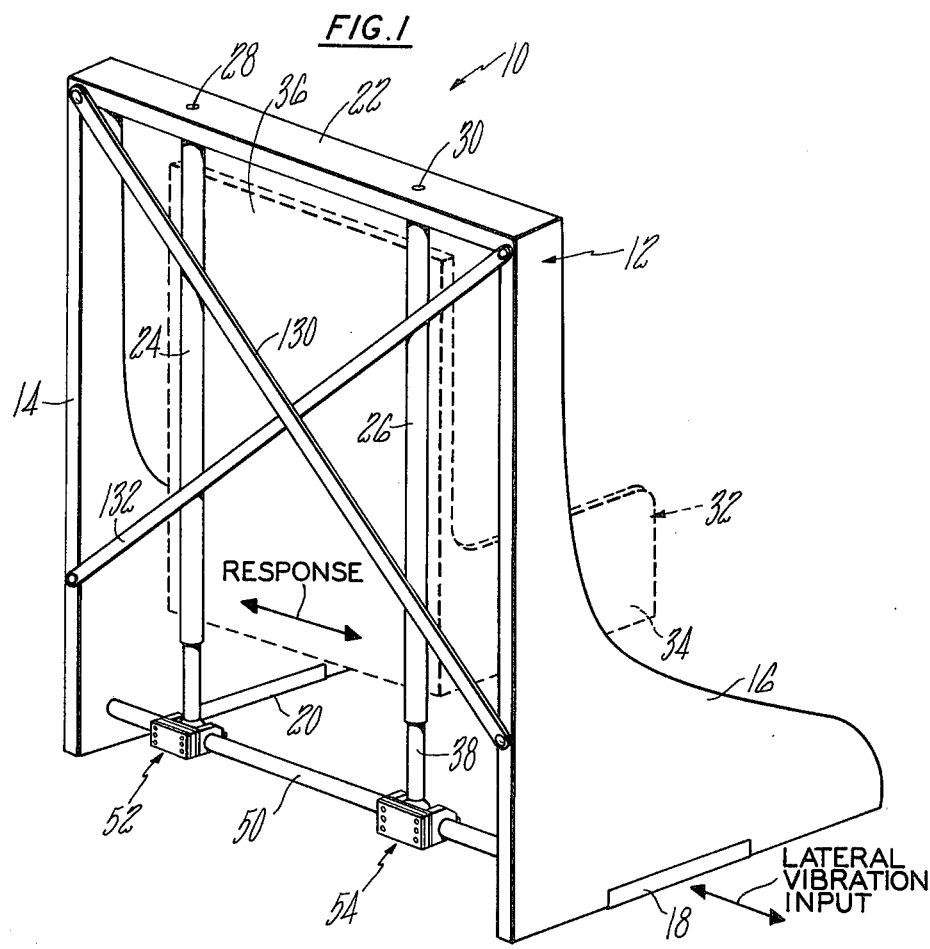
FIG. 1 is a showing of the vibration isolated pilot seat supported within its frame.

Referring to FIG. 1 we see pilot seat assembly 10 which comprises seat frame 12 consisting of substantially vertical side members 14 and 16, which are supported from the floor of the aircraft so as to be adjustable longitudinally in conventional track members 18 and 20, and top member 22 which is supported from side members 14 and 16 in spaced relation to the aircraft floor. Track members 18 and 20 may be of the track type more fully disclosed in U.S. Pat. No. 3,420,475. Energy absorption columns 24 and 26 are suspended substantially vertically downwardly from top member 22 by bolt members 28 and 30 which may be threadably received into the tops of columns 24 and 26, or other conventional connecting means so that columns 24 and 26 would swing from member 22 under lateral load if otherwise unsupported. Seat pan 32, which consists of pilot seat portion 34 and backrest portion 36 is supported from columns 24 and 26. As best shown in FIG. 7, seat pan 32 is supported from energy absorbing columns 24 and 26, column 26 only being shown in FIG. 7 but it should be borne in mind that column 24 and its connection to seat pan 32 is identical with that illustrated for column 26. Column 26 consists basically of central rod member 38 which is suspended from frame portion 22 by bolt member 30 so as to be free hanging therefrom, sleeve member 40 concentrically enveloping member 38, and sleeve member 42 concentrically enveloping sleeve 40. Seat pan 32 is connected to outer sleeve 40 by conventional connecting bolts 44. Seat pan 32 is similarly connected to column 24 so that seat pan 32 is supported from columns 24 and 26 by four or more bolt mechanisms 44. To provide for vertical adjustment of seat pan 32, seat adjustment locking pin 46 is selectively inserted into aligned hole series 48a, 48b and 48c in members 38 and 40. Outer sleeve 42 is joined to and supported from inner sleeve 40 by a conventional energy absorbing means, possibly a cylinder of honeycomb or other frangible material or a hydraulic energy absorber, so that the seat is crashworthy in that, in response to loads of crash magnitude outer sleeve 42 moves downwardly relative to inner sleeve 40 through the conventional energy absorbing means to thereby absorb the crash magnitude loads. During normal operation sleeves 40 and 42 are joined so that as sleeve 40 is selectively positioned with respect to central rod member 38 by seat adjusting locking pin 46, sleeve 42 is so positioned thereby and carries seat pan 32 to the selected vertical position for pilot comfort. We accordingly see that seat pan 32 is supported by columns 24 and 26, which are in turn supported in suspended fashion from the top member 22 of frame 12. It is necessary to support the bottom ends of columns 24 and 26 from frame 12 so that the frame will react longitudinal loads imposed upon the bottom of columns 24 and 26 when the pilot sits upon seat pan 32.

The longitudinal loads at the bottom of columns 24 and 26 are imparted to frame 12 by providing lateral seat brace 50, which is connected to and extends between frame side members 14 and 16 in spaced relationship to the floor, and which is joined to the bottom end of columns 24 and 26 by shoe assemblies 52 and 54, which are identical.

Figure 2:
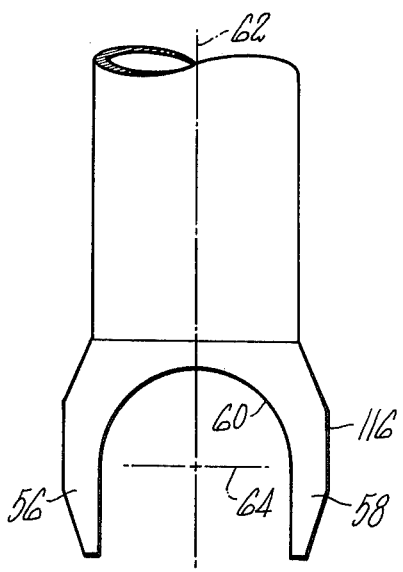
FIG. 2 is a side view of the bottom end of a seat energy absorbing column.

Referring to FIGS. 2-6 we see shoe assembly 52, and the parts thereof, which is identical with shoe assembly 54. The bottom end of column 24 is forked as best shown in FIG. 2 and shaped to have legs 56 and 58 which straddle lateral brace 50 and inner circular surface 60 which is a selected amount larger than the diameter of lateral brace 50 so that limited motion is permitted between lateral brace 50 and column 24 both along vertical axis 62 and longitudinal axis 64.

Figure 3:
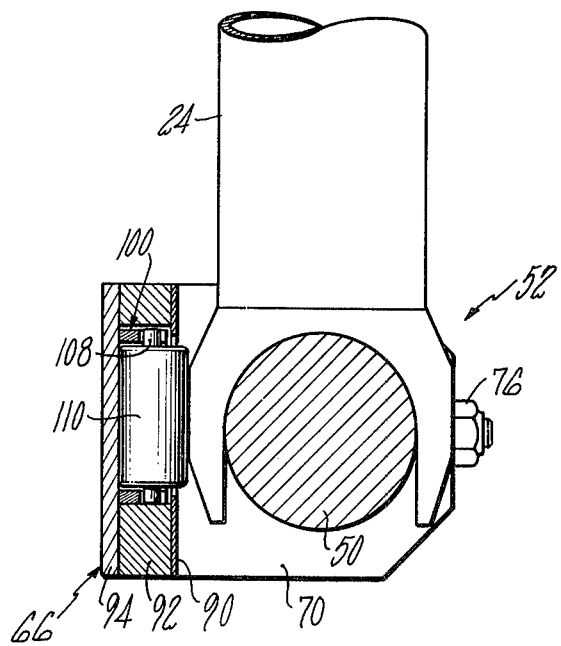
FIG. 3 is a side view, partly in cross-section, of the connection between a seat energy absorbing column and the lateral seat brace.
Figure 4:
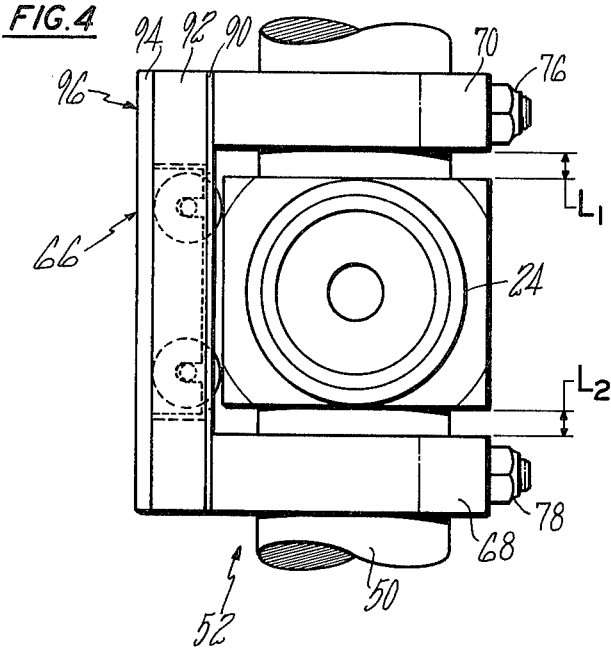
FIG. 4 is a top view of the connection between an energy absorbing column and the lateral seat brace.
Figure 5:
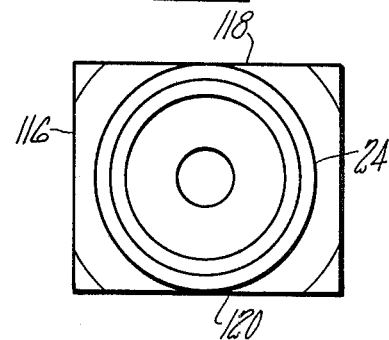
FIG. 5 is a top view of the shoe portion or bottom end of an energy absorbing column.
Figure 6:
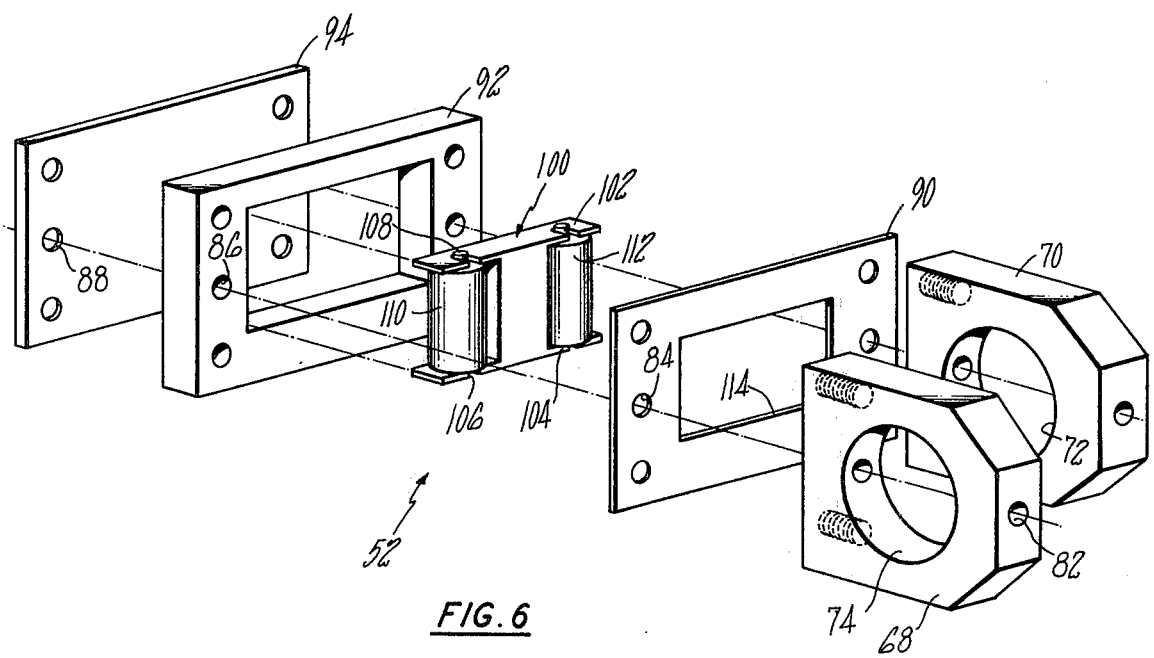
FIG. 6 is an exploded view of the members used to connect the bottom end of a seat energy absorbing column to the lateral seat brace.

As best shown in FIGS. 3 and 4, support column 24 is connected to lateral brace 50 by means of U-shaped support member 66. Leg members 68 and 70 of U-shaped member 66 include central bores 72 and 74 (see FIG. 6), which are sleeved over lateral brace 50 and connected thereto by bolt mechanisms 76 and 78, which pass through aligned holes, such as 82, 84, 86 and 88 in leg members 68 and 70 and in plate members 90, 92, and 94, as well as through similar aligned holes in brace 50.

Plate members 90, 92 and 94 cooperate to form base 96 of U-shaped member 66. Member 92 has selectively shaped aperture 98 therein to receive I-shaped member 100. I-shaped member 100 includes top flange member 102 and bottom flange member 104, each of which carry slotted indentations, such as 106, in the surfaces thereof facing member 90 so as to receive the support shafts, such as 108, of rollerbearings 110 and 112 and support them in substantially vertically extending relationship. Plate member 90 includes selectively shaped inner aperture 114 which, when bolted to member 92, serves to retain rollers 110 and 112 in I-shaped member 100. Rollers 110 and 112 bear in rolling relationship on flat surface 116 (see FIG. 5) of column 24.

It will accordingly be seen that seat pan 32 is connected to and supported from frame 12 through columns 24 and 26 lateral seat brace 50 in such a fashion that, when the pilot occupies seat 34, the longitudinal seat loads due to the pitching moments resulting from pilots weight are imparted through each column member 24 and 26 into shoe assemblies 52 and 54, then into lateral seat brace 50, and finally into the side members 14 and 16 of seat frame 12. This longitudinal seat loading, in passing through shoe assemblies 52 and 54 passes from surface 116 of each column member 24 and 26, through rollers 110 and 112 and then into U-shaped member 66, lateral seat brace 50, and frame side members 14 and 16, in that order.

In view of the fact that leg members 68 and 70 are connected to lateral brace 50 on opposite sides of columns 24 and 26 and in lateral spaced relationship thereto, which lateral spaced relationship is indicated as L1 and L2 in FIG. 4, relative lateral motion to the extent of lateral dimensions L1 and L2 is permitted between lateral brace 50 and columns 24 and 26, and hence between seat frame 12 and seat 34. This is significant because it is highly desirable that any lateral vibration motion from the aircraft fuselage is not imparted directly to the seat 34. Dimensions L1 and L2 are selected so as to be somewhat larger than the anticipated amplitude of acceptable lateral vibration so that frame 12 may be experiencing normal lateral vibration from the aircraft and not imparting it in amplified form to seat pan 32, however, if crash magnitude loads are experienced in the lateral direction, columns 24 and 26 will be laterally structurally joined to lateral seat brace 50 and frame 12 when the permitted limited lateral motion L1 or L2 is dissipated and U-shaped member 66 bears against either surface 118 or 120 (see FIG. 5) of columns 24 and 26.

The light friction provided as roller members 110 and 112 roll along surface 116 of columns 24 and 26 assure that relative lateral motions L1 and L2 between lateral brace 50 and support columns 24 and 26 are permitted while longitudinal loads are transmitted between base of columns 24 or 26 and lateral brace 50.

Similarly, since the inner surface 60 of columns 24 and 26 is vertically spaced along vertical axis 62 above the top surface of lateral brace 50, limited relative motion in the vertical direction between brace 50 and columns 24 and 26 is permitted but these parts will become structurally joined vertically when one bottoms out on the other under crash loads.

Seat assembly 10 also includes criss-crossed members 130 and 132 which, as best shown in FIG. 1, extend in criss-cross fashion between the top and bottom portions of frame side members 14 and 16. Members 130 and 132 are designed as described hereinafter to be nonstructural, nonload carrying members when small relative lateral motion of normal lateral aircraft vibration amplitude is being experienced between diagonally opposite frame side portions of 14 and 16 but become load carrying, structural members when the relative lateral motion between diagonally opposite side portions of members 14 and 16 exceeds the selectively permitted limits. Members 130 and 132 are preferably either cable or strap members which are selectively overlength so as to permit small lateral relative motion between frame portions 14 and 16 but to laterally join portions 14 and 16 and support frame 12 when forces and motions of crash load magnitude are experienced. Members 130 and 132 could also be strap members joined to frame portions 14 and 16 by a sloppy-link connection of selected magnitude, such as bolt members 131 joining the strap ends to frame portions 14 and 16 through selectively elongated slots 133 in the ends of straps 130 and 132, as shown in FIG. 8. Straps 130 and 132 therefore perform the function of providing lateral support to frame 12 under crash load conditions but permit seat assembly 10 to be of low natural frequency during normal operations so that the helicopter lateral vibrations are not amplified in seat assembly 10. It will therefore be seen that seat assembly 10 provides for both longitudinal and vertical adjustment of the seat, provides a crashworthy seat, and prevents the imparting and amplification of the aircraft lateral vibrations to the pilot seat.

While our invention has been described in the aircraft or helicopter environment, it will be obvious to those skilled in the art that it is equally applicable to seats intended for use in any vehicle experiencing similar lateral vibration problems.

We wish it to be understood that we do not desire to be limited to the exact details of construction shown and described, for obvious modifications will occur to a person skilled in the art.

We claim:

1. A pilot seat adapted to be used in aircraft such as helicopters including:
   1. a frame member adapted to be supported from the aircraft floor and including two side members and a top member extending therebetween in spaced relation to the floor,
   2. at least two seat support members suspended vertically downwardly from said frame top member, 3. a lateral seat brace extending between the said frame side members and connected thereto so as to be in spaced relation to the floor,
4. a seat pan connected to and supported from said support members,
5. means connecting the lower ends of said support members to said lateral seat brace so that longitudinal load is transmitted from said support members to said lateral seat brace, and so that said support members may move laterally with low friction in either direction with respect to said lateral seat brace for a selected small increment of lateral motion, and so that said lateral seat brace and said support members come into lateral contact when said small increment of lateral motion is exceeded, and
6. means connecting the side members of said seat frame so as to permit small increments of lateral motion therebetween in either lateral direction and so as to join the side member structurally when the side members lateral motion exceeds said small increments of lateral motion.

2. A seat according to claim 1 and including means providing low friction between said lateral brace and said support members in response to lateral relative motion therebetween.

3. A seat according to claim 1 and including means to permit limited vertical motion of said lateral brace toward said supporting members or of said supporting members toward said lateral brace and operative so that said lateral brace and said support members are in structural contact when said limited relative vertical motion therebetween is dissipated.

4. A seat according to claim 1 wherein said support members are energy absorption columns operable to dissipate energy when excessive loading is applied to the seat pan.

5. A seat according to claim 1 and including means to adjust the seat pan vertically and longitudinally.

6. A seat according to claim 1 wherein said frame side member joining means are selectively elongated cable members and are joined to the side members by a connecting means of selected slop.

7. A seat according to claim 1 wherein said support members lateral brace connecting means includes:
  1. a U-shaped member having:
    a. leg members connected to said lateral seat brace in spaced relationship to said support members on opposite sides thereof, and
    b. a base member extending substantially parallel to said lateral brace and in spaced relation thereto,
  2. low friction bearing means connecting the base of said U-shaped member to said support members to impart longitudinal loads from the support members through said U-shaped member and to said lateral seat brace, and so as to provide low friction motion between said support members and said lateral seat brace to accommodate small lateral motions therebetween until said support members and said U-shaped member are structurally joined laterally.

8. A seat according to claim 1 wherein said frame member joining means are selectively elongated strap members and are joined to the side members by a connecting means of selected slop.

9. A seat according to claim 1 wherein said frame side member joining means are strap members of selected length and are joined to the side members by a connecting means of selected slop.

10. A pilot seat adapted to be used in aircraft such as helicopters including:
  1. a frame member adapted to be supported from the craft floor and including two side members and a top member extending therebetween in spaced relation to the floor,
  2. at least two seat support members suspended vertically downwardly from said frame top member and extending parallel to the side members,
  3. a seat pan connected to and supported from said support members, and
  4. means connecting the bottom ends of said support members to said seat frame so that longitudinal loads are imparted to said seat frame, and so that limited relative lateral motion is permitted between said support members and said seat frame, and further so that said support members and said seat frame are structurally joined laterally when the relative lateral motion therebetween exceeds a preselected minimum.

11. A seat according to claim 10 and including light friction generating means operable to permit relative lateral motions between said seat frame and said support members while transmitting supporting loads.

12. A seat according to claim 10 and including means connected to said frame member and operable so that the frame member when supporting said support members and said pan, is of low natural frequency during periods when the aircraft is experiencing normal lateral vibrations and so that the frame member is provided lateral support thereby in response to excessive lateral motions of the frame member.

13. A pilot seat adapted to be used in aircraft such as helicopters including:
  1. a frame member adapted to be supported from the craft floor and including two side members and a top member extending therebetween in spaced relation to the floor,
  2. at least two seat support members suspended vertically downwardly from said frame top member,
  3. a seat pan connected to and supported from said support members,
  4. means connecting the bottom ends of said support members to said seat frame so that longitudinal loads are imparted to said seat frame, and so that limited relative lateral motion is permitted between said support members and said seat frame, and further so that said support members and said seat frame are structurally joined laterally when the relative lateral motion therebetween exceeds a preselected minimum, and
  5. including means joining the side members of said frame member so as to permit selected increments of relative lateral motion therebetween and so as to structurally connect said side members when the permitted increments of relative lateral motion therebetween has been dissipated.

* * * * *

UNITED STATES PATENT OFFICE
CERTIFICATE OF CORRECTION

PATENT NO. : 4,003,534
DATED : January 18, 1977
INVENTOR(S) : Irwin J. Kenigsberg, William A. Girvan, Jerome T. L. Abbe It is certified that error appears in the above-identified patent and that said Letters Patent are hereby corrected as shown below:

Column 1

After "PILOT SEAT WITH LATERAL VIBRATION ISOLATION" insert the following paragraph --The invention herein described was made in the course of or under a contract or subcontract thereunder with the Department of the Army.--

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*